United States Patent [19]

Akin

[11] 4,140,812
[45] Feb. 20, 1979

[54] TEXTURIZATION PROCESS USING A REMOVABLE SPACING AGENT

[75] Inventor: Cavit Akin, Warrenville, Ill.

[73] Assignee: Standard Oil Company (Indiana), Chicago, Ill.

[21] Appl. No.: 821,349

[22] Filed: Aug. 3, 1977

[51] Int. Cl.$^2$ .............................................. A23J 3/00
[52] U.S. Cl. ................................. 426/656; 426/104; 426/574; 426/657; 426/802
[58] Field of Search ............... 426/104, 574, 656, 657, 426/802, 431

[56] References Cited

U.S. PATENT DOCUMENTS

| | | |
|---|---|---|
| 3,845,222 | 10/1974 | Tannenbaum .................... 426/524 X |
| 3,870,805 | 3/1975 | Hayes et al. ...................... 426/802 X |
| 3,939,284 | 2/1976 | Akin et al. ............................ 426/657 |
| 3,966,977 | 6/1976 | Levinson et al. ................. 426/802 X |

Primary Examiner—Robert A. Yoncoskie
Assistant Examiner—E. M. Kepplinger
Attorney, Agent, or Firm—Gregory E. Croft; Arthur G. Gilkes; William T. McClain

[57] ABSTRACT

A process for texturizing proteinaceous materials for use in foods comprises mixing the proteinaceous material with a texturizing agent and a spacing agent and adjusting the water content to provide a workable mass, forming the mixture into a desired shape, drying the shaped mixture, heat treating the dried product to fix the shape and texture, and removing the spacing agent.

20 Claims, No Drawings

TEXTURIZATION PROCESS USING A REMOVABLE SPACING AGENT

BACKGROUND OF THE INVENTION

1. Field of the Invention

This invention relates to processes for texturization of proteinaceous materials, particularly those proteinaceous materials which are generally in the form of small particles which do not adhere to one another. More particularly, this invention relates to a texturization method for single-cell protein materials.

2. Description of the Prior Art

Protein products are used in foods for their functionality as well as their nutritional value. The texture of a protein product contributes to its functionality as well as to its taste. Most vegetable protein products, e.g. soy bean protein products, are in the form of powders or grits. A texturization technology has been developed to incorporate some textural characteristics to soybean proteins. One known process produces meat substitutes from edible protein materials by forming fibers of filaments and then, by suitable means, binding the fibers. These protein fibers are prepared from a spinning dope of protein which is forced through a porous membrane such as a spinneret to form fibers which are coagulated in a bath containing suitable acids and salts and are oriented by suitable means, such as by a series of rolls revolving at increasing speeds. The fibers are placed in a salt solution such as sodium chloride of sufficient concentration to prevent the fibers from dissolving.

Textured protein foods can also be produced without spinning. One such process involves the rapid orientation and coagulation of protein material in a substantially undenatured, finely-divided, hydrated state under conditions which produce a shred-like structure. Orientation and coagulation of protein must be coordinated so that coagulation follows orientation of molecules, whereby upon the action of the coagulation influence the molecules are set in a shred-like condition. The process is conducted with about 50% slurry of the protein material in water. The slurry is rapidly heated to and maintained at 360° F. for about 1 minute in an autoclave, then cooled rapidly. A shredded meat-like texture is obtained.

In various other processes mixtures of proteins are used wherein one of these proteins serves as a binder. In such mixtures gluten or egg white is used as a heat coagulating ingredient to set the extruded or shredded protein textures.

In another process a chewy gel is prepared by (a) adjusting the composition of a protein-water system, in particular the pH and the solids content, to a composition conducive to gel formation, (b) the shaping of the system, and (c) applying heat to the adjusted system as is necessary to produce a chewy gel. The shaping may take place before or after either of the other steps of the process. The final products produced in accordance with this process simulate the fibrous texture, chewiness and structure of meats such as pot roast, roast beef, or the like.

In all these known protein food texturization processes spun or extruded fibers are produced in a coagulating bath, or in a gel system. The fibers then are bound together to imitate the fibrous texture and the mouth feel of meats. Appropriate flavoring and seasoning agents are added as needed.

On the other hand, microbial cells (single-cell proteins) and some plant proteins are obtained in the form of powders. In such form these proteins are not considered as having a desirable texture for large scale food applications. However, it has now been found that the texture of muscle tissue can be imitated using these powdered protein materials without the need for fibrous product formation.

SUMMARY OF THE INVENTION

In one aspect the invention resides in a process for texturizing proteinaceous materials, said process comprising mixing the proteinaceous material with a texturizing agent and a soluble spacing agent, forming the mixture into a desired shape, with the addition of sufficient amounts of liquid if necessary, drying the shaped mixture, heat treating the dried product to fix the texture, and removing the spacing agent by dissolution in a solvent. Any proteinaceous material having at least 15 percent protein is suitable for use in the process of this invention, including animal protein materials, plant protein materials, and single-cell protein materials such as yeasts. The texturizing agent can be any proteinaceous substance which sets upon exposure to heat. Such materials as gelatin, protein concentrates, protein isolates, and mixtures thereof are preferred. The spacing agent can be any substance which is readily soluble in a suitable liquid solvent. Table salt, for example, is a preferred spacing agent because it is inexpensive, nontoxic, and readily soluble in water. The proteinaceous material, the texturizing agent, and the spacing agent are generally mixed in dry form with the addition of a liquid such as water to help shape the mixture into a proper form. The shaped mixture can be dried and heat treated in separate steps or in one step as desired. The heat treatment is carried out at a temperature of from about 80° to about 250° C. to set the proteins and render the textured product non water-dispersible. After fixing the textured structure the spacing agent is removed by soaking the textured structure in an appropriate solvent and dissolving the spacing agent. In the case of a salt spacing agent, the preferred solvent is water.

More particularly, the invention resides in a process for texturizing single-cell protein materials, such as yeasts, said process comprising mixing the single-cell protein material with a texturizing agent and a spacing agent such that the weight ratio of the single-cell material to the texturizing agent is in the range of about 9:1 to about 1:9 and such that the weight ratio of the single-cell protein material combined with the texturizing agent to the spacing agent is in the range of about 3:1 to about 1:3, adjusting the water content of the mixture between about 10 to about 70 percent, shaping the mixture as desired, drying the shaped mixture, heat treating the shaped mixture at a temperature of from about 80° to about 250° C. for at least about 3 minutes to fix the shape and texture, and removing the spacing agent.

DESCRIPTION OF THE PREFERRED EMBODIMENTS

The following examples will serve to illustrate various aspects of this invention without implied limitation.

EXAMPLE 1

*Candida utilis* (Torula yeast) was grown in an aqueous ethanol and minerals medium in a continuous fermentor and spray dried. A mixture was prepared containing the dry cells, Supro-7 (a soy isolate sole by Ralston Purina), and kitchen salt in dry form. The weight ratio of cells to Supro-7 was selected from the range of 9/1 to 1/9 with the preferred range of 3/1 to 1/1. The ratio of cells + Supro-7 to salt was selected from the range of 3/1 to 1/3. A minimum amount of water was added which would allow adequate shaping of the mixture. The water weight of the wet mixture ranged from 10% to 70%, with a preferred range of 30% to 50%. When a meat grinder was used as the shaping device, a water weight content of 35-45% was found adequate. In this mixture Supro-7 served as the texturizing agent and the salt as the removable spacing agent. The shaped product was dried in an oven at 80° C. The dry product was light in color and contained visible salt crystals distributed within the structure. The dry product texture was fixed by heating the product in an oven at 200° C. for 10 minutes. The fixed product had light brown color and nut-like aroma. It did not disperse in water but rather became slightly swollen and developed a spongelike appearance and softness as the salt was dissolved out. The wet product was rinsed several times with water to remove the salt residue. The resulting product was chewable, had a ground meat-like mouthfeel, and tasted slightly but pleasantly toasted.

EXAMPLE 2

The procedure of Example 1 was repeated except that the formed product was dried in microwave oven. The final product characteristics were similar to those of Example 1.

EXAMPLE 3

The procedure of Example 1 was repeated except that the shaped product was directly heated in an oven for 20 minutes at 200° C. to accomplish drying and fixing in one step. The final product characteristics were similar to those of Example 1.

It will be apparent to those skilled in the art that many variations from the examples, shown here for purposes of illustration, can be made without departing from the scope of this invention.

I claim:

1. A process for texturizing proteinaceous materials comprising:
   (a) mixing a proteinaceous material not normally having substantial texturizing properties containing at least 15 weight percent protein with a proteinaceous texturizing agent which sets upon exposure to heat and a nontoxic soluble spacing agent to form a mixture in proportions capable of producing a textured product upon subsequent heat setting and removal of the spacing agent;
   (b) forming the mixture into a desired shape with sufficient amounts of liquid to effect said forming;
   (c) drying the shaped mixture;
   (d) heat treating the dried product to sufficiently set the dried product so that it is non-dispersable in the solvent subsequently used to remove the spacing agent; and
   (e) removing the spacing agent by dissolution in a solvent.

2. The process of claim 1 wherein the spacing agent is a salt.

3. The process of claim 2 wherein the salt is removed by soaking the heat treated dried product in water.

4. The process of claim 1 wherein the proteinaceous material is a single-cell protein material.

5. The process of claim 1 wherein the texturizing agent is a protein concentrate, protein isolate, or gelatin.

6. A process for texturizing single-cell protein materials comprising:
   (a) mixing the single-cell protein material containing at least 15 weight percent protein with a proteinaceous texturizing agent which sets upon exposure to heat and a nontoxic soluble spacing agent such that the weight ratio of the single cell material to the texturizing agent is in the range of about 9:1 to about 1:9 and such that the weight ratio of the cells combined with the texturizing agent to the spacing agent is from about 3:1 to about 1:3;
   (b) adjusting the water content of the mixture between about 10 to about 70 weight percent;
   (c) shaping the mixture;
   (d) drying the shaped mixture;
   (e) heat treating the shaped mixture at a temperature of from about 80° to about 250° C. for at least 3 minutes to fix the shape and texture; and
   (f) removing the spacing agent by dissolution in a solvent.

7. The process of claim 6 wherein the texturizing agent is selected from the group consisting of protein concentrates, protein isolates, and gelatin.

8. The process of claim 6 wherein the texturizing agent is soy isolate.

9. The process of claim 8 wherein the spacing agent is table salt.

10. The process of claim 9 wherein the weight ratio of single-cell material to soy isolate is in the range of from about 3:1 to about 1:1.

11. The process of claim 10 wherein the water content of the mixture is from about 30 to about 50 weight percent.

12. The process of claim 11 wherein the dried mixture is fixed by heattreating at a temperature of about 200° C. for about 10 minutes.

13. The process of claim 12 wherein the salt is removed from the fixed product by soaking the fixed product in water.

14. The process of claim 13 wherein the single-cell protein material is a yeast.

15. The process of claim 14 wherein the single-cell protein material is *Candida utilis* yeast.

16. A textured product produced by the process of claim 1.

17. A textured product produced by the process of claim 15.

18. The process of claim 1 wherein the spacing agent is removed by dissolution in water.

19. A textured product produced by the process of claim 2.

20. A textured product produced by the process of claim 9.

* * * * *